(12) United States Patent
Quilici et al.

(10) Patent No.: US 10,904,392 B2
(45) Date of Patent: Jan. 26, 2021

(54) SYSTEM AND METHOD FOR FACILITATING SETUP AND JOINING OF CONFERENCE CALLS

(71) Applicant: YouMail, Inc., Irvine, CA (US)

(72) Inventors: Alexander E. Quilici, Malibu, CA (US); Michael J. Rudolph, San Juan Capistrano, CA (US)

(73) Assignee: YouMail, Inc., Irvine, CA (US)

( * ) Notice: Subject to any disclaimer, the term of this patent is extended or adjusted under 35 U.S.C. 154(b) by 104 days.

(21) Appl. No.: 15/666,130

(22) Filed: Aug. 1, 2017

(65) Prior Publication Data

US 2018/0034970 A1 Feb. 1, 2018

Related U.S. Application Data

(60) Provisional application No. 62/369,510, filed on Aug. 1, 2016.

(51) Int. Cl.
*H04L 12/16* (2006.01)
*H04M 3/42* (2006.01)
(Continued)

(52) U.S. Cl.
CPC ........ *H04M 3/563* (2013.01); *H04L 61/1594* (2013.01); *H04M 3/42153* (2013.01);
(Continued)

(58) Field of Classification Search
CPC ............... H04M 2201/40; H04M 3/56; H04M 3/42068; H04M 15/55; H04M 2203/655; H04M 2215/2046; H04M 3/562; H04M 3/567; H04M 7/0027; H04M 7/123; H04M 7/1275; H04M 3/565; H04M 3/42059; H04M 2242/22; H04M 2250/62;
(Continued)

(56) References Cited

U.S. PATENT DOCUMENTS

| 4,277,649 A | 7/1981 | Sheinbein |
| 5,033,076 A | 7/1991 | Jones et al. |

(Continued)

FOREIGN PATENT DOCUMENTS

| CA | WO2009021332 | 2/2009 |
| CN | 104580777 | 4/2015 |

(Continued)

OTHER PUBLICATIONS

International Search Report and Written Opinion for Application No. PCT/US16/28351, dated Jul. 21, 2016 (9 pages).

(Continued)

*Primary Examiner* — Ahmad F. Matar
*Assistant Examiner* — Kharye Pope
(74) *Attorney, Agent, or Firm* — Meister Seelig & Fein LLP; Seth H. Ostrow, Esq.

(57) ABSTRACT

A system for managing a conference call, the system comprising a call answering server configured to receive a call from an attendee device that has been forwarded from a host device, identify a conference call associated with the host device for the attendee device to join, receive a request from the attendee device to join the conference call, and connect the attendee device to the conference call.

21 Claims, 4 Drawing Sheets

(51) Int. Cl.
*H04M 3/56* (2006.01)
*H04L 29/12* (2006.01)
*H04M 3/533* (2006.01)

(52) U.S. Cl.
CPC ... *H04M 3/53308* (2013.01); *H04M 3/53383* (2013.01); *H04M 3/42059* (2013.01); *H04M 2203/5009* (2013.01); *H04M 2203/5027* (2013.01); *H04M 2203/5081* (2013.01)

(58) Field of Classification Search
CPC . H04M 2203/5009; H04M 2203/5027; H04M 2203/5063; H04M 2215/208; H04M 3/42042; H04L 12/1822; H04L 29/06027; H04L 29/06; H04L 12/1439; H04L 12/1482; H04L 65/1096; H04L 65/4007; H04L 47/72; H04L 12/1818; H04L 65/403; H04L 67/306; H04L 12/1813; H04L 12/1831
USPC .............. 379/202.01, 204.01, 203.01, 93.21; 370/352, 252, 353, 260, 261, 356
See application file for complete search history.

(56) References Cited

U.S. PATENT DOCUMENTS

| | | | |
|---|---|---|---|
| 5,265,145 A | 11/1993 | Lim | |
| 5,276,731 A | 1/1994 | Arbel et al. | |
| 5,404,400 A | 4/1995 | Hamilton | |
| 5,479,493 A | 12/1995 | Baker et al. | |
| 5,497,414 A | 3/1996 | Bartholomew | |
| 5,530,931 A * | 6/1996 | Cook-Hellberg | H04M 3/54 379/207.05 |
| 5,533,106 A | 7/1996 | Blumhardt | |
| 5,596,627 A | 1/1997 | Solomon et al. | |
| 5,625,680 A | 4/1997 | Foladare et al. | |
| 5,638,424 A | 6/1997 | Denio et al. | |
| 5,644,629 A | 7/1997 | Chow | |
| 5,651,053 A | 7/1997 | Mitchell | |
| 5,727,047 A | 3/1998 | Bentley et al. | |
| 5,748,709 A | 5/1998 | Sheerin | |
| 5,768,348 A | 6/1998 | Solomon et al. | |
| 5,774,531 A | 6/1998 | Johnson | |
| 5,781,613 A | 7/1998 | Knuth et al. | |
| 5,828,731 A | 10/1998 | Szlam et al. | |
| 5,832,072 A | 11/1998 | Rozenblit | |
| 5,867,562 A | 2/1999 | Scherer | |
| 5,883,942 A | 3/1999 | Lim et al. | |
| 6,005,870 A * | 12/1999 | Leung | H04M 3/436 370/466 |
| 6,130,937 A | 10/2000 | Fotta | |
| 6,208,970 B1 | 3/2001 | Ramanan | |
| 6,233,319 B1 | 5/2001 | Cox et al. | |
| 6,289,084 B1 | 9/2001 | Bushnell | |
| 6,298,122 B1 | 10/2001 | Horne | |
| 6,307,926 B1 | 10/2001 | Barton et al. | |
| 6,330,317 B1 | 12/2001 | Garfinkel | |
| 6,385,310 B1 | 5/2002 | Holiday, II | |
| 6,459,780 B1 | 10/2002 | Wurster et al. | |
| 6,477,246 B1 | 11/2002 | Dolan et al. | |
| 6,549,619 B1 | 4/2003 | Bell et al. | |
| 6,697,461 B1 | 2/2004 | Middleswarth et al. | |
| 6,757,290 B1 * | 6/2004 | Kalmanek, Jr. | H04L 29/12377 370/401 |
| 6,788,773 B1 | 9/2004 | Fotta | |
| 6,816,469 B1 | 11/2004 | Kung | |
| 6,853,717 B1 | 2/2005 | Frentz et al. | |
| 6,990,187 B2 | 1/2006 | MacNamara et al. | |
| 7,027,576 B2 | 4/2006 | Schwab | |
| 7,079,638 B1 | 7/2006 | Beauchamp et al. | |
| 7,099,444 B1 | 8/2006 | Russell | |
| 7,127,050 B2 | 10/2006 | Walsh et al. | |
| 7,158,630 B2 | 1/2007 | Fotta | |
| 7,162,019 B1 | 1/2007 | Mullis et al. | |
| 7,236,577 B2 | 6/2007 | Lection et al. | |
| 7,295,660 B1 | 11/2007 | Higginbotham et al. | |
| 7,352,855 B2 | 4/2008 | Bedingfield, Sr. | |
| 7,372,948 B2 | 5/2008 | Walsh et al. | |
| 7,593,517 B2 | 9/2009 | Walsh et al. | |
| 7,593,520 B1 * | 9/2009 | Croak | H04M 3/385 379/202.01 |
| 7,613,286 B2 | 11/2009 | Hong | |
| 7,756,259 B2 | 7/2010 | Martin | |
| 7,822,188 B1 * | 10/2010 | Kirchhoff | H04L 51/043 379/211.02 |
| 7,953,214 B2 | 5/2011 | Horne | |
| 8,014,500 B2 | 9/2011 | Chou | |
| 8,085,916 B2 | 12/2011 | Walsh et al. | |
| 8,243,909 B2 | 8/2012 | Wood et al. | |
| 8,416,938 B2 | 4/2013 | Wood et al. | |
| 8,467,512 B2 | 6/2013 | Amir et al. | |
| 8,548,149 B2 | 10/2013 | Czachor, Jr. et al. | |
| 8,548,447 B1 | 10/2013 | Kirchhoff et al. | |
| 8,577,002 B2 | 11/2013 | Stein et al. | |
| 8,781,093 B1 | 7/2014 | Rybak et al. | |
| 8,787,549 B2 | 7/2014 | Wood et al. | |
| 9,232,056 B2 | 1/2016 | Liu | |
| 2002/0067813 A1 | 6/2002 | Pelletier et al. | |
| 2002/0114431 A1 | 8/2002 | McBride et al. | |
| 2003/0026407 A1 | 2/2003 | Ernstrom et al. | |
| 2003/0072426 A1 | 4/2003 | Davidson et al. | |
| 2003/0095541 A1 * | 5/2003 | Chang | H04M 7/0057 370/352 |
| 2003/0152198 A1 | 8/2003 | Price | |
| 2003/0215078 A1 * | 11/2003 | Brahm | H04M 3/4281 379/211.02 |
| 2004/0196968 A1 | 10/2004 | Yue | |
| 2005/0105510 A1 * | 5/2005 | Reding | H04W 4/16 370/352 |
| 2005/0185784 A1 | 8/2005 | Chiu et al. | |
| 2005/0207557 A1 | 9/2005 | Dolan et al. | |
| 2005/0271196 A1 | 12/2005 | Florkey et al. | |
| 2006/0126820 A1 | 6/2006 | Trandal et al. | |
| 2006/0193453 A1 | 8/2006 | Price | |
| 2006/0239429 A1 | 10/2006 | Koch et al. | |
| 2007/0026852 A1 * | 2/2007 | Logan | H04M 1/72561 455/422.1 |
| 2007/0071212 A1 | 3/2007 | Quittek et al. | |
| 2007/0111743 A1 * | 5/2007 | Leigh | H04L 12/1818 455/518 |
| 2007/0121825 A1 | 5/2007 | Walsh et al. | |
| 2007/0143422 A1 | 6/2007 | Cai | |
| 2007/0165554 A1 * | 7/2007 | Jefferson | H04M 3/42263 370/315 |
| 2007/0165811 A1 | 7/2007 | Reumann et al. | |
| 2007/0165821 A1 | 7/2007 | Altberg et al. | |
| 2007/0253543 A1 | 11/2007 | Horne | |
| 2007/0286101 A1 * | 12/2007 | Gagne | H04L 12/1818 370/260 |
| 2007/0291108 A1 * | 12/2007 | Huber | H04N 7/15 348/14.02 |
| 2008/0084975 A1 | 4/2008 | Schwartz | |
| 2008/0159490 A1 | 7/2008 | Gaudin et al. | |
| 2008/0205616 A1 * | 8/2008 | Teng | G06Q 10/109 379/202.01 |
| 2008/0292077 A1 | 11/2008 | Vinokurov et al. | |
| 2009/0149167 A1 * | 6/2009 | Patel | H04W 76/40 455/416 |
| 2010/0046731 A1 * | 2/2010 | Gisby | H04M 3/436 379/211.01 |
| 2010/0067681 A1 * | 3/2010 | Kafka | H04M 15/00 379/202.01 |
| 2010/0189238 A1 * | 7/2010 | Gupta | H04L 12/1818 379/202.01 |
| 2010/0216443 A1 | 8/2010 | Jacobstein | |
| 2010/0261486 A1 | 10/2010 | Sheha et al. | |
| 2010/0278325 A1 | 11/2010 | Singh et al. | |
| 2011/0033035 A1 | 2/2011 | Turner | |
| 2011/0051917 A1 * | 3/2011 | Chen | H04M 3/56 379/202.01 |
| 2011/0081011 A1 * | 4/2011 | Gavita | H04M 3/42102 379/201.02 |

(56) References Cited

U.S. PATENT DOCUMENTS

| | | | |
|---|---|---|---|
| 2011/0182415 A1* | 7/2011 | Jacobstein | H04L 12/1818 |
| | | | 379/202.01 |
| 2011/0228922 A1* | 9/2011 | Dhara | H04L 12/1818 |
| | | | 379/202.01 |
| 2011/0280136 A1 | 11/2011 | Yang | |
| 2012/0128144 A1 | 5/2012 | Chislett et al. | |
| 2012/0269333 A1 | 10/2012 | Goguen | |
| 2012/0321064 A1 | 12/2012 | Czachor, Jr. et al. | |
| 2013/0305167 A1* | 11/2013 | Bastide | H04L 65/1069 |
| | | | 715/753 |
| 2014/0038575 A1 | 2/2014 | Buzdugan | |
| 2014/0211928 A1 | 7/2014 | LeBlanc | |
| 2015/0023222 A1* | 1/2015 | Logan | G06Q 10/109 |
| | | | 370/260 |
| 2015/0087280 A1 | 3/2015 | Farrand et al. | |
| 2015/0095014 A1 | 4/2015 | Marimuthu | |
| 2015/0334230 A1 | 11/2015 | Volzke | |
| 2015/0350418 A1 | 12/2015 | Rauenbuehler | |
| 2016/0072955 A1* | 3/2016 | Barkan | H04M 3/42212 |
| | | | 455/417 |
| 2018/0034970 A1* | 2/2018 | Quilici | H04L 61/1594 |

FOREIGN PATENT DOCUMENTS

| | | |
|---|---|---|
| EP | 2922284 | 9/2015 |
| WO | 2010060013 | 5/2010 |

OTHER PUBLICATIONS

Fahlman, Scott E., Selling Interrupt Rights: A Way to Control Unwanted E mail and Telephone Calls, IBM Systems Journal, 2002, vol. 41, No. 4, pp. 759-766.

PCT International Search Report and Written Opinion for International Application No. PCT/US17/44910, dated Nov. 27, 2017, 10 pages.

Patent Cooperation Treaty International Search Report, dated Nov. 27, 2017, International Searching Authority.

Questel—FAMPAT, Translation document of CN104580777.

Search_Report_Singapore, dated Nov. 14, 2019, Intellectual Property Office of Singapore, Singapore.

Written_Opinion_Singapore, dated Nov. 18, 2019, Intellectual Property Office of Singapore, Singapore.

Partial Supplemental European Search Report, dated Dec. 16, 2019, European Patent Office.

* cited by examiner

SYSTEM AND METHOD FOR FACILITATING SETUP AND JOINING OF CONFERENCE CALLS

CROSS REFERENCE TO RELATED APPLICATION

This application claims the priority of U.S. Provisional Application No. 62/369,510, entitled "SYSTEM AND METHOD FOR FACILITATING SETUP AND JOINING OF CONFERENCE CALLS," filed on Aug. 1, 2016, the disclosure of which is hereby incorporated by reference in its entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

Field of the Invention

The present invention relates to the field of communications and more specifically to multi-party real-time conference communications such as conference calls.

Description of the Related Art

Conference call communications are a tool widely used in business as a means to facilitate communication between two or more parties. Most current systems enable conference calls by utilizing a special call number dedicated to conferencing and identify the members of the conference as a host or participants. The host is typically the party that creates a conference call, normally by specifying a certain time or schedule whereby the conference will occur (e.g., 2 pm today, every Tuesday at 2 pm, etc.). The conference is then joined by both host and participants by using a telephone to connect into the dedicated conference number at the desired time and typically by providing other identifying information such as a conference room identifier or a passcode/personal identification number (PIN).

Often a party will have difficulty attending a conference call on time or at all, as they will not have at-hand the required conference call number, conference room identifier and/or passcode/PIN. Normally these details are communicated by other means such email, software or physical calendars, etc. In a busy workday, parties are often unable to quickly access the details required to attend the conference, and time is lost as they search their email accounts, their physical desktop, or use computer devices or their mobile devices to access calendars. Further, individuals on-the-go, such as those driving motor vehicles, often have difficulty remembering and then entering a complex set of numbers into a keypad, without having to stop their primary task completely, or find themselves repeatedly consulting and then inputting these complex sequences of numbers as their connections fail and the process has to be started over.

Thus, there is a need for the ability to create conference calls that require no additional details from the host or participants to begin or join the conference call.

SUMMARY OF THE INVENTION

The present invention provides a system and non-transitory computer-readable media for management of a conference call. The system comprises a call answering server configured to receive a call from an attendee device that has been forwarded from a host device, identify a multi-party real-time communication associated with the host device for the attendee device to join, receive a request from the attendee device to join the multi-party real-time communication, and connect the attendee device to the multi-party real-time communication.

According to one embodiment, the call answering server may be further configured to identify the multi-party real-time communication based on an identification of the attendee device. The call answering server may also be configured to identify the attendee device based on an address book associated with the host device. In another embodiment, the call answering server is configured to use the address book to provide information about participants in the multi-party real-time communication when the participants join or leave the multi-party real-time communication. The call answering server configured to identify the multi-party real-time communication based on a database of multi-party real-time communications or hosts. The call answering server may create a conference bridge between the host device and the attendee device.

In a certain embodiment, the call answering server is configured to greet the attendee device to inform the attendee device has correctly connected to the host device. The call answering server may also receive call answering configurations associated with the host device. The call answering server can handle the call from the attendee device based on the call answering configurations. The call answering configurations may include options for call greeting, voice message services, and conference joining. According to one embodiment, the call answering server is configured to receive a request from the attendee device to record a voicemail message. The call from the attendee device can be established using an Internet-based telephony connection or a public switched telephone network connection.

The non-transitory computer-readable media comprises computer program code for receiving a call from an attendee device that has been forwarded from a host device, computer program code for identifying a multi-party real-time communication associated with the host device for the attendee device to join, computer program code for receiving a request from the attendee device to join the multi-party real-time communication, and computer program code for connecting the attendee device to the multi-party real-time communication.

The non-transitory computer-readable media may further comprise computer program code for identifying the multi-party real-time communication based on an identification of the attendee device. In another embodiment, the non-transitory computer-readable media further comprises computer program code for identifying the attendee device based on an address book associated with the host device. The non-transitory computer-readable media may also comprise computer program code for using the address book to provide information about participants in the multi-party real-time communication when the participants join or leave the multi-party real-time communication. In yet another embodiment, the non-transitory computer-readable media further comprises computer program code for identifying the multi-party real-time communication based on a database of multi-party real-time communications or hosts. The call from the attendee device can be established using an Internet-based telephony connection or a public switched telephone network connection.

BRIEF DESCRIPTION OF THE DRAWINGS

The invention is illustrated in the figures of the accompanying drawings which are meant to be exemplary and not limiting, in which like references are intended to refer to like or corresponding parts.

DETAILED DESCRIPTION OF THE INVENTION

Figure 1:
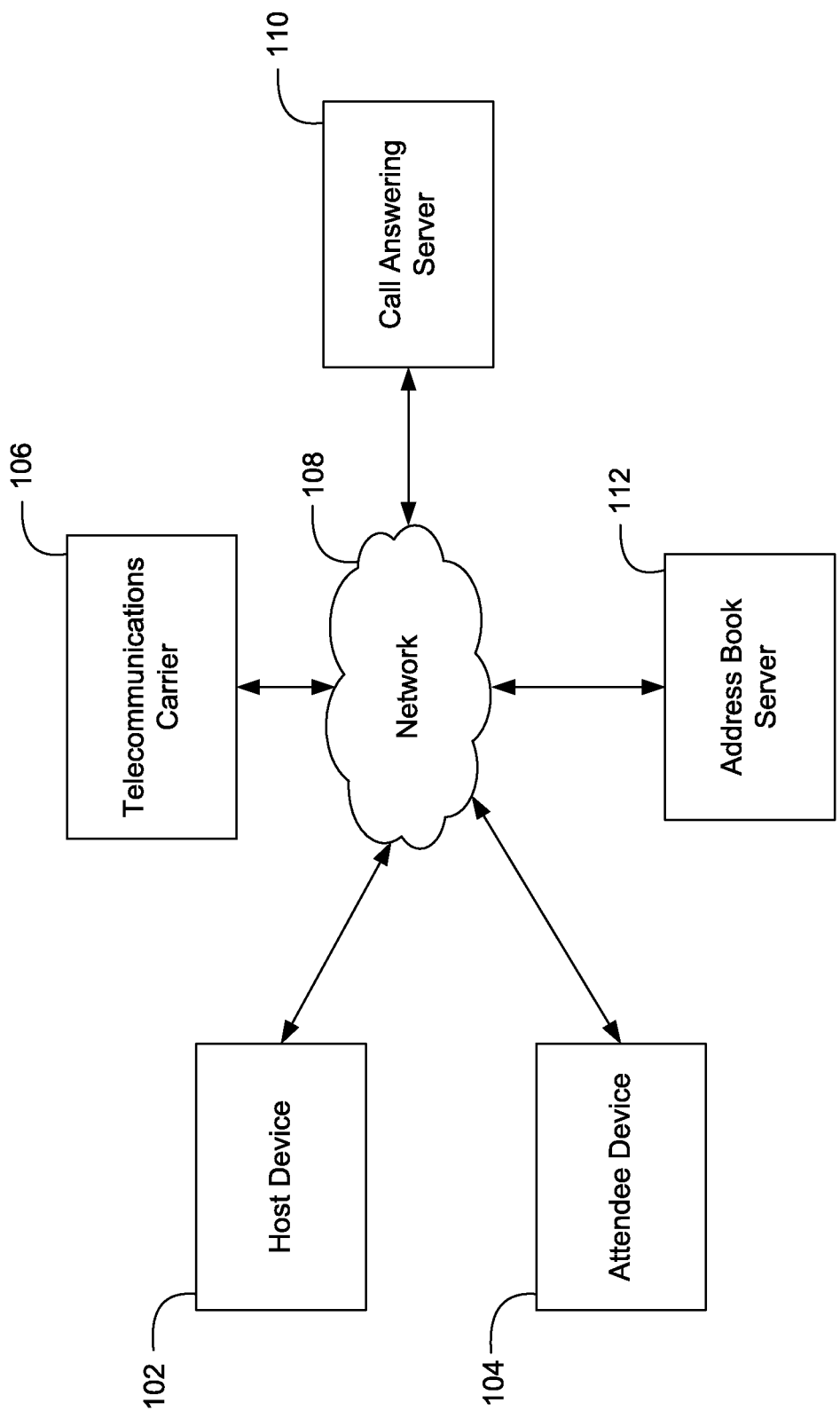
FIG. 1 illustrates a system according to an embodiment of the present invention.

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be utilized and structural changes may be made without departing from the scope of the present invention. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The present disclosure provides a method and system for enabling persons or entities who wish to host a conference call or other types of multi-party real-time communications with minimal setup effort involved, such as communicating technical details such as a specialized conference number, conference room identifier or passcode/PIN, is disclosed. By knowing the conference call host, a participant can dial or send a communication request to the host's number, and the host, knowing that a conference is occurring, can ignore the call, allowing a server or machine providing communication services, such as a call answering system, to answer the participant's call or communication request and if the participant is a qualified participant, either directly place them into the conference, or allow them to join the conference upon pressing a single device key indicating their intent to join the conference. Further, the call answering system can automatically identify and announce new participants to others when they join or leave the conference, without the need for such new participant to record any name or other information before or upon joining a conference.

A host wishing to begin a conference call with other participants may already possess a contact number that is known or available to the other participants, such as their mobile phone number or a landline office phone number. The host can ask participants to dial or submit a communication request to this known number at a desired time for a conference call session, and those participants can indicate, when the host's number answers via a call answering server, that they would like to join the relevant conference call. In this way, the participants are not required to obtain a number specialized for the conference call, nor a conference room identifier, nor a special PIN or passcode to enter the conference.

Upon joining the conference call, the call answering server can use metadata from the incoming parties requesting to begin or join a call, combined with a variety data sources about the phone numbers of the host and of each participant, to determine the identities of each participant, and to then provide customized audio to the host and each participant identifying any or all of those parties on the call, at any time, including identifying the time at which any participant joins or leaves the call.

The disclosed call answering system may be used to supplement or replace conventional voicemail service provided by telecommunication carriers. Unanswered calls (e.g., ignored by the call recipient, or when the call recipient is busy, or the call recipient's receiving device is either not operational or "turned off") may be forwarded to the call answering system, where a variety of activities may be performed. These include joining the caller to a conference call of the call recipient; greeting the caller; and prompting the caller to record a voicemail message for the intended call recipient.

FIG. 1 presents a system according to an embodiment of the present invention. The system comprises a plurality of client devices including host device 102 and attendee device 104 that are communicatively interconnected by network 108. Network 108 may be any suitable type of network allowing transport of data communications across thereof and between devices, such as, between servers and client devices or other types of devices, including between wireless devices coupled via a wireless network. For example, Network 108 may include any combination of voice and data lines such as private branch exchange (PBX), public switched telephone network (PSTN), integrated services digital network (ISDN), digital subscriber line (DSL), and Internet lines. Additionally, the network may be the Internet, following known Internet protocols for data communication, or any other communication network, e.g., any local area network (LAN) or wide area network (WAN) connection, cellular network, wire-line type connections, wireless type connections, or any combination thereof. Communications to and from client devices may be encrypted using, for example, the Advanced Encryption Standard (AES) with a 128, 192, or 256-bit key size, or any other encryption standard known in the art.

Host device 102 and attendee device 104 may comprise computing devices (e.g., desktop computers, television devices, terminals, laptops, personal digital assistants (PDA), cellular phones, smartphones, tablet computers, smart watches and wearable devices, or any computing device having a central processing unit and memory unit capable of connecting to a network). The client devices may include hardware capable of establishing a connection over voice and/or data lines, or software that converts analog audio to a digitized form and transmits it over network 108. A client device may include or execute a variety of operating systems, including a personal computer operating system, such as a Windows, Mac OS or Linux, or a mobile operating system, such as iOS, Android, or Windows Mobile, or the like. A client device may further include or execute an application to communicate content, such as, for example, textual content, audio content, multimedia content, or the like. A client device may also include or execute an application to perform a variety of possible tasks, such as browsing, searching, and playing various forms of content, including streamed audio and video. A client device may include or may execute a variety of possible applications, such as a client software application enabling communication with other devices, such as communicating one or more messages, such as via email, short message service (SMS), or multimedia message service (MMS), including via a network, as well as a social network, including, for example, Facebook, LinkedIn, Snapchat, Twitter, Pinterest, Instagram, or Google+, to provide only a few possible examples.

The system further includes a call answering server 110 that can be configured to provide voicemail and conferencing services. Host device 102 may configure, either locally on the device or with telecommunications carrier 106, forwarding of unanswered calls directed to host device 102 to call answering server 110. For example, call answering server 110 may be configured to receive an unanswered call to host device 102 from attendee device 104. Call answering server 110 may answer forwarded calls by greeting the caller, providing an option for the caller to join a conference call with the call recipient (host device 102), or recording a voice message. Optionally, the call answering server 110 may vary call answering and available options based on an identification of the caller (e.g., known and unknown callers). Call answering server 110 can identify callers by extracting caller identification information from an incoming call (e.g., caller ID (identification) or header in data packets of Internet Protocol (IP) calls) or accessing contacts from the host device 102 from local storage or address book server 112. Address book server 112 may include an online address book, contact list, or social networking service where host device 102 may upload, import, and backup contacts from the host device 102 to a cloud server.

According to one embodiment, call answering server 110 includes software and/or hardware for creating a conferencing bridge for one or more conference participants, such as host device 102 and attendee device 104. A conference may be established over the conference bridge by a call leader, such as, host device 102. Host device 102 may create the conference line, for example, requesting or otherwise transmitting conference configurations to call answering server 110. Attendees, such as attendee device 104, may join a conference line created by host device 102 by transmitting a communication request directly to host device 102. Conference attendees may be remotely located and establish connections to the host device 108 via network 108 through any suitable mechanism. The call answering server 110 may include a plurality of ports which can be programmed to accept calls from attendees via unanswered call forwarding to the call answering server 110. Call answering server 110 can process communications received through network 108 via, for example, PSTN or Internet-based telephony (e.g., based on session initiation protocol (SIP), H.323, VoIP, etc.). Telephony connections may be established through network 108 to the conference bridge (call answering server 110), or any other suitable manner. As such, calls to host device 102 may be connected by call answering server 110 to the conference line created by host device 102.

Servers, as described herein, may vary widely in configuration or capabilities but are comprised of at least a special-purpose digital computing device including at least one or more central processing units and memory. A server may also include one or more of mass storage devices, power supplies, wired or wireless network interfaces, input/output interfaces, and operating systems, such as Windows Server, Mac OS X, Unix, Linux, FreeBSD, or the like.

Figure 2:
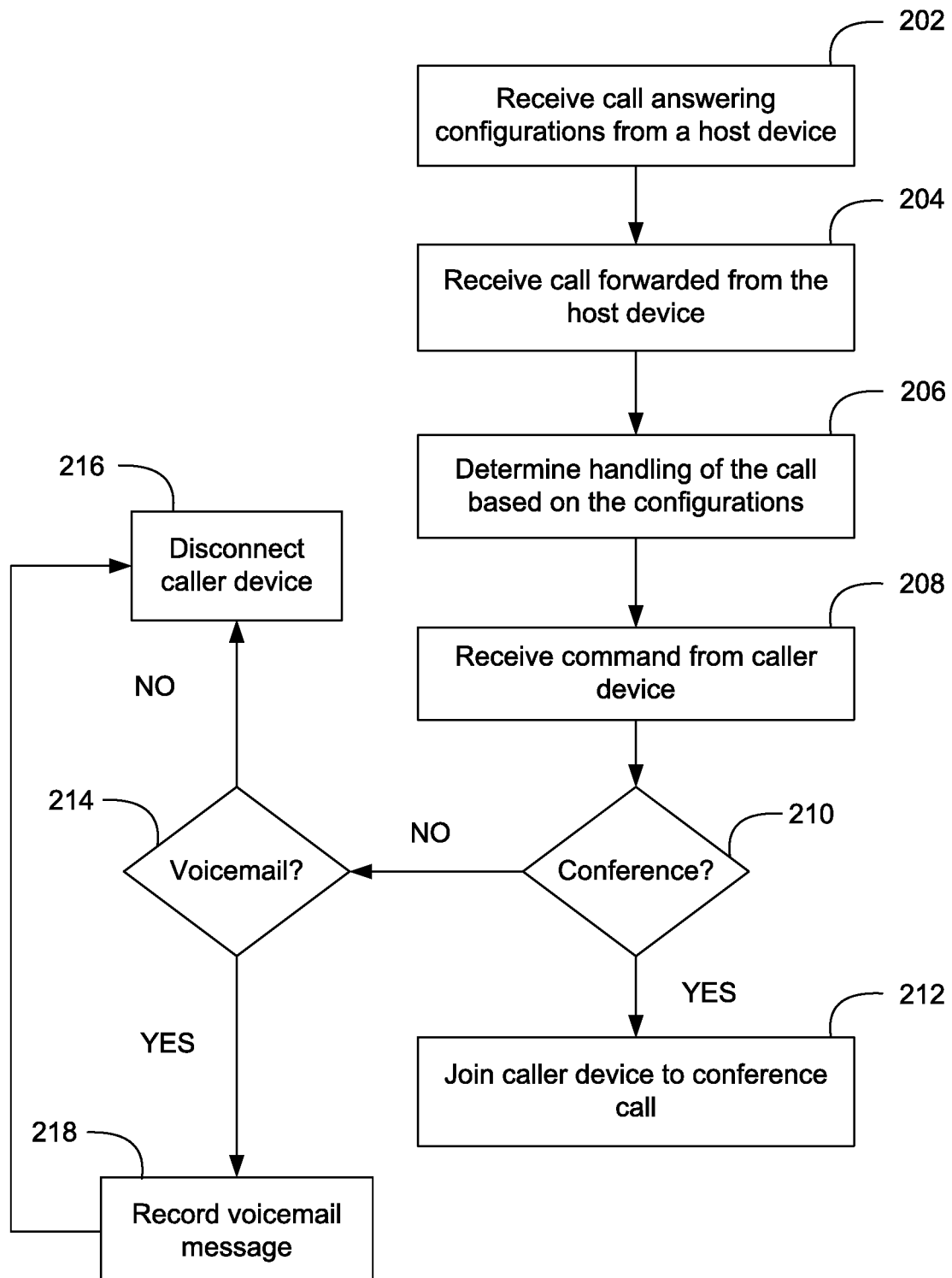
FIG. 2 illustrates a flowchart of a method for establishing a conference call according to an embodiment of the present invention.

FIG. 2 illustrates a flowchart of a method for establishing a conference call according to an embodiment of the present invention. Call answering configurations are received from a host device, step 202. The host device may establish an account with a call answering system to configure handling of call forwarding from the host device based on the call answering configurations. The call answering configurations may include options for answering unanswered calls, such as, call greeting, providing voice message services, and joining a caller (to the host device) to a conference line created by the host device. The call answering configurations may be synchronized with call forwarding functionality, either through the telecommunications carrier associated with the host device or through settings on the host device.

A call forwarded from the host device is received, step 204. The call forwarded from the host device may be an unanswered call, that is, a call from a caller (device) that the host device may choose to ignore or decline. The call answering configurations may cause routing of the unanswered call from the caller device to connect with the call answering system. Handling of the call is determined based on the call answering configurations, step 206. The call may be answered by the call answering service by greeting the caller and providing the caller with an option for the caller to leave a voice message or join a conference call created by the host device.

A command from the caller device is received, step 208. The call answering system determines whether the command is a request to join the conference call, step 210. If the command contains a request to join the conference call, the caller device is joined to the conference call by bridging the forwarded call to the conference line, step 212. Optionally, the caller may be prompted for a passcode designated by the host to allow joining to the conference call. Otherwise, the call answering system determines whether the command includes a request to be directed to a voicemail service, step 214. A request to be directed to the voicemail service allows the caller to record a voicemail message with the call answering system, step 218. The caller device is then disconnected, step 216. If the command does not indicate that the caller wishes to proceed to voicemail service, the call is disconnected, step 216.

Figure 3:
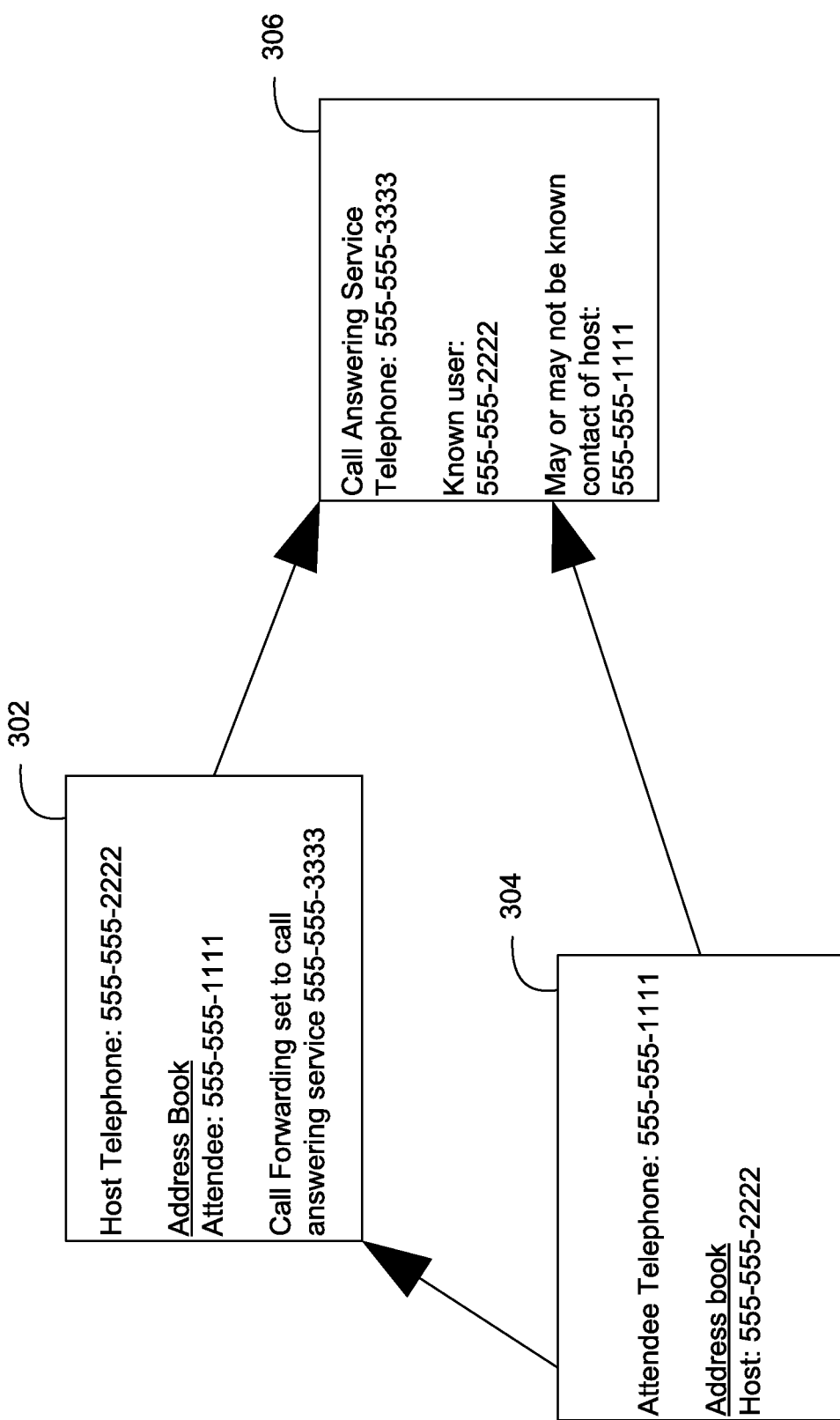
FIG. 3 illustrates a block diagram of a method for routing a conference call according to an embodiment of the present invention.

FIG. 3 presents a host establishing conference calls with a call answering service according to an embodiment of the present invention. The call answering service may include software, instructions, or functions that are performed by a device such as the call answering server disclosed herewith. The host 302 may create an account in variety of ways, such as, by downloading an application or going online to a web site. The host 302 can then configure call or message forwarding for their phone number 555-555-1111 to 555-555-3333 of the call answering service 306, whether it's a device, a landline, VOIP line, or PBX, which is done in a variety of ways, from submitting special '*' codes to the call answering service telephone number, to going online at a carrier web site, or calling the carrier and requesting that the forwarding be set up. The configuration may include a relationship between an attendee 304, host 302 and call answering service 306 devices and phone numbers. In particular, the host 302 may configure the call answering service 306 to receive a call from an attendee 304 when the attendee's call is ignored or declined. The call answering service 306 may greet the attendee and provide an option for the attendee to join a conference call, without the need for the host to specify information about who is attending or when the conference call is going to happen. The call answering service 306 can examine metadata information of the call to determine which conference to connect the caller to. For example, in the case of a call connected using SIP, it can inspect the SIP diversion header to determine the original called number, which in turn can be evaluated against a database of conference calls or hosts to determine which host's mailbox and conferences should be accessed by that caller. Optionally, a host's "address book" may be accessed or retrieved from a cloud for identifying conference call parties. For example, "555-555-1111" may or may not be a known contact of host 302 until call answering service 306 accesses or retrieves the host's address book. The call answering server may also use the address book or data sources to generate and automatically provide audio information about other participants in the conference call whenever someone joins or leaves the conference call.

Figure 4:
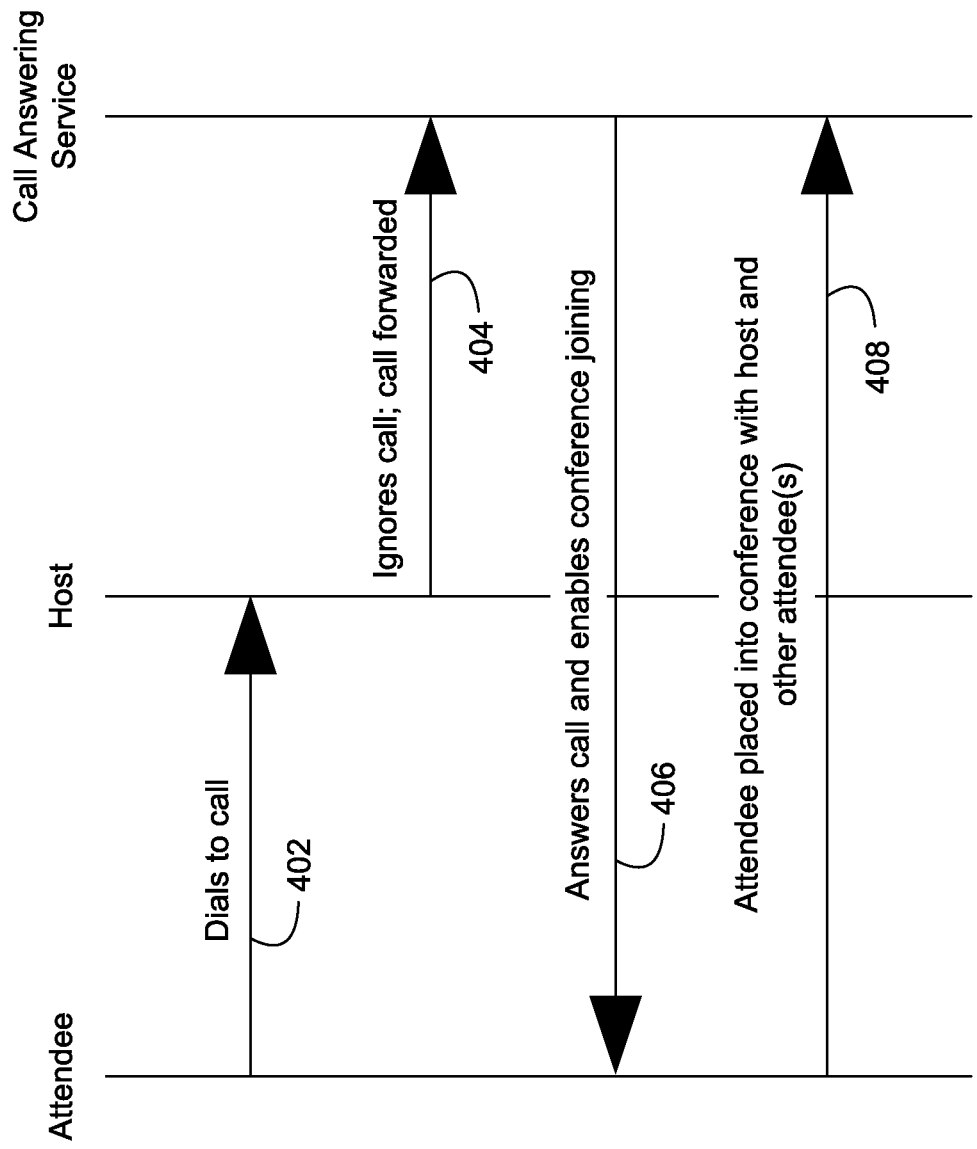
FIG. 4 illustrates a sequence diagram of connecting an attendee's call to a conference according to an embodiment of the present invention.

FIG. 4 presents a sequence diagram of a method for joining attendees to a conference according to an embodiment of the present invention. A host may allow attendees to join a conference communication session created by the host by redirecting calls, for example, call forwarding or unanswered calls, from the attendees to a call answering service. An attendee transmits a communication request to the host's normal number to call the host, 402. The host can ignore the call and the host's call forwarding configuration may send the attendee's call to a call answering service, 404. The call answering service is operable to greet the attendee, confirming that the attendee has correctly connected to the host, and enable conference joining by the attendee, 406. The attendee can elect to join the conference, causing the call answering service to place the attendee into the conference. The attendee is placed into a conference communication session with the host and any other attendee(s), 408. Hosts can join their own conference in the same way as the participants by, for example, calling a phone number to join the conference communication session, or pressing a button in an application or web service, which determines the appropriate number to submit a communication request and then transmit it for them.

FIGS. 1 through 4 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps). In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer-readable program code) are stored in a main and/or secondary memory, and executed by one or more processors (controllers, or the like) to cause the one or more processors to perform the functions of the invention as described herein. In this document, the terms "machine readable medium," "computer-readable medium," "computer program medium," and "computer usable medium" are used to generally refer to media such as a random access memory (RAM); a read only memory (ROM); a removable storage unit (e.g., a magnetic or optical disc, flash memory device, or the like); a hard disk; or the like.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

What is claimed is:

1. A system for managing a conference call, the system comprising:
   a call answering server configured to:
   receive an unanswered call directed to a contact number of a user device, the contact number being a number normally used to communicate with the user device, wherein the unanswered call is from an attendee device that has been forwarded from the user device to the call answering server based on call answering configurations for the contact number including instructions for forwarding the unanswered call if caller identification information of the attendee device is present in contact information stored on the user device;
   create a conference call with the user-device;

answer the unanswered call by greeting the attendee device with a confirmation that the attendee device has correctly connected to the contact number for the user device;

determine that the conference call is accessible by the attendee device based on the presence of the caller identification information in the user device contact information;

provide an option to the attendee device to join the conference call with the user device based on the determination that the conference call is accessible by the attendee device, regardless of whether the attendee device and a conference time were specified to the call answering server in advance of the unanswered call;

receive a request from the attendee device to join the conference call; and connect the attendee device to the conference call.

2. The system of claim 1 further comprising the call answering server configured to provide the option to the attendee device to join the conference call based on an identification of the attendee device.

3. The system of claim 2 further comprising the call answering server configured to identify the attendee device based on an address book associated with the user device.

4. The system of claim 3 further comprising the call answering server configured to use the address book to provide information about participants in the conference call when the participants join or leave the conference call.

5. The system of claim 1 further comprising the call answering server configured to provide the option to the attendee device to join the conference call based on a database of conference calls or hosts.

6. The system of claim 1 further comprising the call answering server configured to create a conference bridge between the user device and the attendee device.

7. The system of claim 1 further comprising the call answering server configured to receive the call answering configurations associated with the user device.

8. The system of claim 7 further comprising the call answering server configured to handle the unanswered call from the attendee device based on the call answering configurations.

9. The system of claim 7 wherein the call answering configurations include options for call greeting, voice message services, and conference joining.

10. The system of claim 1 wherein the unanswered call from the attendee device is established using an Internet-based telephony connection.

11. The system of claim 1 wherein the unanswered call from the attendee device is established using a public switched telephone network connection.

12. Non-transitory computer-readable media comprising computer program code that when executed by a programmable processor causes execution of a method for managing a conference call, the non-transitory computer-readable media comprising:

computer program code for receiving an unanswered call directed to a contact number of a user device, the contact number being a number normally used to communicate with the user device, wherein the unanswered call is from an attendee device that has been forwarded from the user device to the call answering server based on call answering configurations for the contact number including instructions for forwarding the unanswered call if caller identification information of the attendee device is present in contact information stored on the user device;

computer program code for creating a conference call with the user device;

computer program code for answering the unanswered call by greeting the attendee device with a confirmation that the attendee device has correctly connected to the contact number for the user device;

computer program code for determining that the conference call is accessible by the attendee device based on the presence of the caller identification information in the user device contact information;

computer program code for providing an option to the attendee device to join the conference call with the user device based on the determination that the conference call is accessible by the attendee device, regardless of whether the attendee device and a conference time were specified to the call answering server in advance of the unanswered call;

computer program code for receiving a request from the attendee device to join the conference call; and computer program code for connecting the attendee device to the conference call.

13. The non-transitory computer-readable media of claim 12 further comprising computer program code for providing the option to the attendee device to join the conference call based on an identification of the attendee device.

14. The non-transitory computer-readable media of claim 13 further comprising computer program code for identifying the attendee device based on an address book associated with the user device.

15. The non-transitory computer-readable media of claim 14 further comprising computer program code for using the address book to provide information about participants in the conference call when the participants join or leave the conference call.

16. The non-transitory computer-readable media of claim 12 further comprising computer program code for providing the option to the attendee device to join the conference call based on a database of conference calls or hosts.

17. The non-transitory computer-readable media of claim 12 wherein the unanswered call from the attendee device is established using an Internet-based telephony connection.

18. The non-transitory computer-readable media of claim 12 wherein the unanswered call from the attendee device is established using a public switched telephone network connection.

19. The system of claim 1 further comprising the call answering server configured to:

receive a second unanswered call directed to the user device, the second unanswered call is from a second attendee device that has been forwarded from the user device to the call answering server based on the call answering configurations.

20. The system of claim 1 further comprising the call answering server configured to:

receive a plurality of unanswered calls directed to the contact number of the user device, wherein the unanswered calls are from a plurality of attendee devices that have been forwarded from the user device to the call answering server;

determine that the conference call is accessible by the plurality of attendee devices based on presence of caller identification information of the plurality of attendee devices in the user device contact information; and provide an option to the plurality of attendee devices to join the conference call with the user device based on the determination that the conference call is accessible by the plurality of attendee devices.

21. The non-transitory computer-readable media of claim 12 further comprising:
   computer program code for receiving a plurality of unanswered calls directed to the contact number of the user device, wherein the unanswered calls are from a plurality of attendee devices that have been forwarded from the user device to the call answering server;
   computer program code for determining that the conference call is accessible by the plurality of attendee devices based on presence of caller identification information of the plurality of attendee devices in the user device contact information; and
   computer program code for providing an option to the plurality of attendee devices to join the conference call with the user device based on the determination that the conference call is accessible by the plurality of attendee devices.

\* \* \* \* \*